Dec. 1, 1970     L. H. DIEMOND     3,543,363
FLEXIBLE CLAMP CUT-OFF AND SLOTTING TOOL CUTTER
Filed March 26, 1968
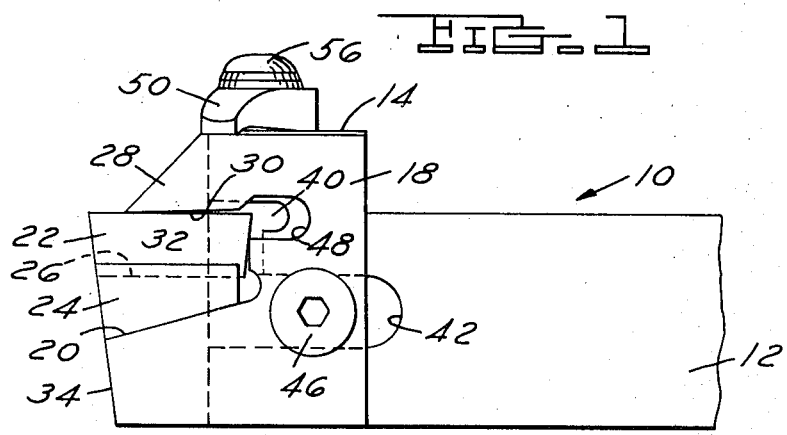
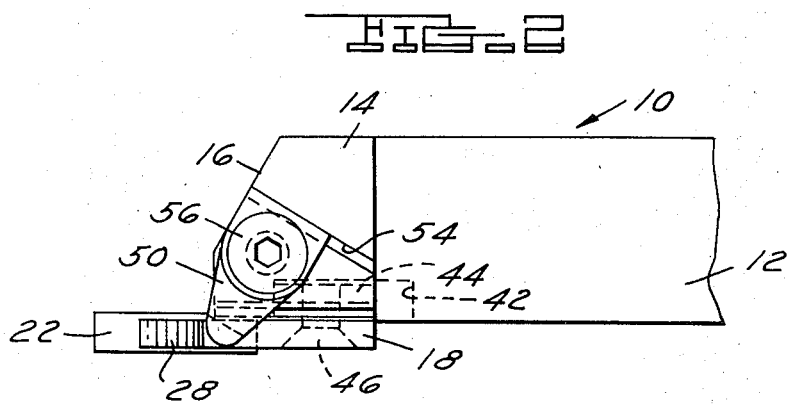
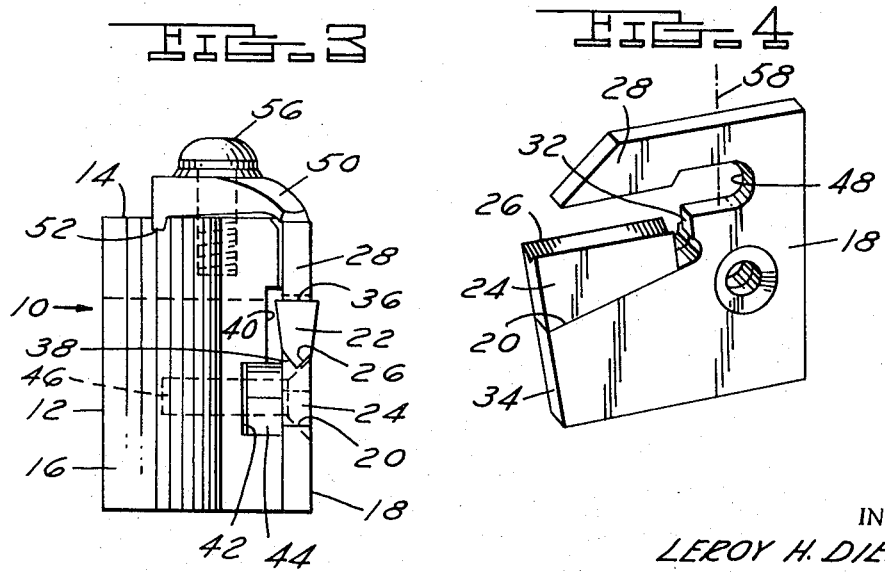
INVENTOR.
LEROY H. DIEMOND
BY
Farley, Forster & Farley
ATTORNEYS United States Patent Office 3,543,363
Patented Dec. 1, 1970

3,543,363
FLEXIBLE CLAMP CUT-OFF AND SLOTTING TOOL CUTTER
Leroy H. Diemond, East Hartford, Conn., assignor to The Valeron Corporation, a corporation of Michigan
Filed Mar. 26, 1968, Ser. No. 716,093
Int. Cl. B26d 1/00
U.S. Cl. 29—96                                     3 Claims

ABSTRACT OF THE DISCLOSURE

An integral clamp arm arrangement provided in a blade holder for cut-off and slotting tools which includes a clamp arm extending over the insert seat and formed to yield to an external clamping force to retain the insert securely in place.

BACKGROUND OF THE INVENTION

In cut-off and grooving tools using changeable cutting inserts, the cutting inserts must be held securely on a blade which projects substantially from the holder in order to accommodate deep cuts and is narrower than the cutting width of the insert. This is usually accomplished by using a separate overhanging clamp on the tool holder to hold the insert on the upper edge of the forwardly projecting part, commonly called the blade holder.

The overhanging clamp arrangement has inherent limitations in locating the clamp accurately over the insert to hold the insert square on the blade holder seat, and frequently a substantial set-up time necessary to be sure the insert is properly located and securely held; the farther out the cutting insert must extend the less suitable is this type of arrangement.

Overhanging clamps with a clamp arm that is narrower than the insert and extend forwardly with it are known and do allow a somewhat greater extension of an insert, but with this comes the added problems of locating the clamp arm within the side edge planes of the insert over its extended length.

Accordingly, a simplified arrangement for retaining cutting inserts on a blade holder has been needed.

SUMMARY OF THE INVENTION

The present invention is directed to cut-off and grooving tools in general and is more particularly directed to a flexible clamp arm arrangement for changeable cutting inserts which is integral with the blade holders.

The tool envisioned by this invention makes use of a separate blade holder secured to the side of a tool holder and extending beyond the attachment face. Within the leading end of the blade holder, and spaced from its uppermost edge, an insert retaining slot is formed such that the overhanging part serves as a clamp arm and the underlying edge of the slot serves to accommodate an anvil seat for the cutting insert. A relief is provided beyond the insert slot and in a manner which enables the integral clamp arm to be flexed down to hold an insert securely on its seat by an overhanging clamp mounted on the tool body and engaged therewith while alignment is assured by the integral construction notwithstanding substantial extension beyond the clamp.

The overhanging clamp need not be located with the same close tolerances as for clamps which directly engage an insert since its function is only to engage the integral clamp arm of the holder and to flex it enough for the desired clamping pressure. The clamping arm of the holder has its underside formed and always disposed to engage and hold the insert square on its seat and may be undercut and otherwise formed to assure maximum clamping pressure starting near the leading end of the insert.

Blade holders formed with the integral clamp arm arrangement of this invention may be made to extend appreciably beyond the tool holder since the force necessary to apply the clamping pressure can be applied effectively well back from the end of the clamp arm. It is also possible that a screw arrangement may be used across the relief slot, where the wall thickness of the blade holder permits, to contract the slot and effect the necessary clamping pressure.

DESCRIPTION OF THE DRAWING

FIG. 1 is a side elevational view of a cutting tool including the features of this invention;
FIG. 2 is a plan view of the cutting tool;
FIG. 3 is a front end view; and
FIG. 4 is a perspective view of the blade holder per se used in the cutting tool of the other drawing figures.

DETAILED DESCRIPTION

A cutting tool 10 is shown with a holder 12 having a head 14 that extends higher than the holder body and has one of its front corners cut back at a relief angle, as at 16. A blade holder 18 is secured to one side of the head 14 to extend therebeyond and is formed to include an opening 20 in its terminal end in which is received the cutting insert 22.

Within the opening 20 in the end of the blade holder, and below the insert 22, is provided an insert seating anvil 24 which is secured in place as by brazing or bonding and is formed on its upper edge to include a V-groove seat 26 for the particular type of cutting insert shown. The overhanging part 28 of the blade holder, over the slot opening for the insert, is formed to provide a clamp arm to hold the insert on the seating member 24 and it will be noted is relieved on its underside, as at 30, back into the slot opening.

A back shoulder wall 32 is formed in the blade holder opening 20 a spaced distance from the seating member 24 and for engagement by the blade end of the insert 22, below its cutting edge, to assure the proper location and extension of the insert for cutting purposes beyond the end of the blade holder. The insert, its seating member, and the blade holder are all formed at their outermost ends to include, together, a relief angle 34 for the tool and to thereby expose the cutting end of the insert for its intended purpose.

The insert 22 has a cutting width which is greater than the thickness, or width, of the blade holder 18 so that its side edges project beyond both side walls of the holder for chip clearance. This is best shown in FIG. 3 where it will also be noted that the sides of the insert are formed to include a clearance angle from its upper planar cutting surface 36 and that it is formed to include an underside edge 38 complementary to the V-groove seat 26 in the seating member 22.

The side wall of the tool head 14 is formed to include a relief opening or depression 40 immediately adjacent the overhanging cutting edge of the insert, as shown in FIGS. 1–3, but most apparent in the latter. It is also provided with a key way slot 42 for orienting engagement with the blade holder 18 which has a locating key 44 provided on its inner side wall face.

The blade holder 18 is fastened to the head end of the tool by a screw 46 received transversely through the holder and its locating key and into the tool holder body.

Behind the holder opening 20, in which the insert is disposed, and rearwardly over the shoulder wall 32, there is provided a relief slot or opening 48 that is in open communication with the insert slot opening and extends up into the underside of the insert clamping arm 28. This rearwardly extending opening 48 serves to make the clamp arm sufficiently flexible well within elastic limits, to be formed for sufficient clearance to position the cutting insert 22 thereunder and to yield to a clamp pressure applied thereover to positively and securely hold the insert in place.

A conventional type of overhanging clamp 50 is shown mounted on the head end 14 of the tool shank with its clamping end extending over the clamping arm of the blade holder for this purpose. It includes a fulcrum foot 52 guided in a slot 54 on the tool head, to orient the clamping end relatively forward over the blade holder, and it is activated by a screw 56.

In the cutting tool shown, this particular type of overhanging clamp, for activating the actual insert retaining clamp arm 28, is preferred. In other instances however, and although not specifically shown, it will be understood that a screw might be provided across the relief slot, if the thickness of the blade holder permits, to activate the flexible clamp arm; as along the phantom line 58 in the last drawing figure.

The overhanging clamp does not have to be located on the tool body relative to the insert with the close tolerances required when it must have direct engagement with an insert. This results in savings in manufacturing cost and set-up time. The insert retaining clamp arm 28 is integral with the blade holder and is made to yield within the plane of the holder and square against the planar surface of the insert; thereby assuring positive and immediate location of the insert for cutting purposes.

The integral clamp arm 28 may porject close to the cutting end of the insert and be formed for chip clearance, as shown. It may also be formed for first engagement with the insert near the cutting end and acting back towards the locating shoulder 32, but ultimately applies a clamping pressure along the extended length of the insert and directly against the insert anvil seat.

The external clamping pressure may be applied well back on the integral clamp arm 28, without adverse effect due to the built in flexibility of the clamp arm, provided its forwardly extending end has sufficient built in stiffness and the clamping pressure is applied near the forward end of the relief slot 48, which allows it to yield.

The cutting and/or grooving tool including the features of this invention can be seen to have many advantages over like tooling presently known and in use.

While preferred embodiments have been described above in detail, it will be understood that numerous modifications might be resorted to without departing from the scope of the invention as defined in the following claims.

1. A grooving and cutting tool, comprising:
  a tool head, an insert holder engaged to a side wall of said head and extended beyond an end thereof,
  said holder having a width less than the cutting width of the insert to be held thereby and including an opening formed within the extended end thereof and receptive of such insert with its cutting end extending further therebeyond,
  said opening being of a size and configuration to receive an insert in close fitting and still removable relation therein and including a back locating shoulder wall for engagement by the insert,
  a locating anvil seat for the insert provided in the underlying side of the insert receptive opening, an overhanging integral co-planar clamp arm provided by the holder overlying said opening,
  and adjustable clamp means mounted on said head and extending transversely over said clamp arm for flexing said clamp arm within its elastic limits and contracting said opening for retaining an insert secure on said seat.

2. The grooving and cutting tool of claim 4,
  said insert receptive opening being formed to extend beyond said locating shoulder wall and within said clamp arm for extending the fulcrum for said clamp arm rearwardly and providing a relief clearance over a rearwardly disposed cutting edge of a reversible insert as used therein.

3. The grooving and cutting tool of claim 5,
  said locating anvil seat being separately secured in said opening forwardly and in spaced relation to said locating shoulder wall.

References Cited
UNITED STATES PATENTS

| | | | |
|---|---|---|---|
| 1,814,882 | 7/1931 | Zinslen | 29—96 X |
| 2,348,089 | 5/1944 | Niekirk | 29—105 |
| 3,044,148 | 7/1962 | Allendorfer | 29—96 |
| 3,066,385 | 12/1962 | Vana | 29—96 |
| 3,060,554 | 10/1962 | Kirchner | 29—96 |
| 3,124,864 | 3/1964 | Frommelt | 29—96 |
| 3,123,896 | 3/1964 | Wilson | 29—96 |
| 3,205,558 | 9/1965 | Stier | 29—96 |

HARRISON L. HINSON, Primary Examiner

PO-1050
(5/69)

UNITED STATES PATENT OFFICE
CERTIFICATE OF CORRECTION

Patent No. 3,543,363      Dated December 1, 1970

Inventor(s) Leroy H. Diemond

It is certified that error appears in the above-identified patent and that said Letters Patent are hereby corrected as shown below:

Column 3, line 30, change "porject" to --project--.

Column 4, line 24, change "4" to --1--.

Column 4, line 31, change "5" to --2--.

Signed and sealed this 26th day of October 1971.

(SEAL)
Attest:

EDWARD M. FLETCHER, JR.          ROBERT GOTTSCHALK
Attesting Officer                Acting Commissioner of Patent